United States Patent
Gonzalez Martinez et al.

(10) Patent No.: US 9,464,812 B2
(45) Date of Patent: Oct. 11, 2016

(54) GAS SUPPLY MODULE FOR BURNER WITH BEADED GAS SUPPLY TUBE

(71) Applicant: Whirlpool Corporation, Benton Harbor, MI (US)

(72) Inventors: Luis Miguel Gonzalez Martinez, Celaya Guanajuato (MX); Jaime Heladio Landa Calderon, Celaya Gaunajuato (MX); Eduardo Ludlow Palafox, Queretaro (MX); Manuel Mata Carrales, Celaya Guanajuato (MX)

(73) Assignee: Whirlpool Corporation, Benton Harbor, MI (US)

( * ) Notice: Subject to any disclaimer, the term of this patent is extended or adjusted under 35 U.S.C. 154(b) by 90 days.

(21) Appl. No.: 13/662,952

(22) Filed: Oct. 29, 2012

(65) Prior Publication Data

US 2014/0116558 A1    May 1, 2014

(51) Int. Cl.

| F24C 3/08 | (2006.01) |
|---|---|
| F16L 3/01 | (2006.01) |
| F24C 3/00 | (2006.01) |
| F16L 13/14 | (2006.01) |
| F23D 14/04 | (2006.01) |
| F23D 14/64 | (2006.01) |
| F23K 5/00 | (2006.01) |
| F23D 14/46 | (2006.01) |

(52) U.S. Cl.
CPC .............. *F24C 3/008* (2013.01); *F16L 13/147* (2013.01); *F23D 14/04* (2013.01); *F23D 14/46* (2013.01); *F23D 14/64* (2013.01); *F23K 5/007* (2013.01)

(58) Field of Classification Search
CPC ........ F23D 14/04; F23D 14/64; F23D 14/46; F23C 3/08; F16L 13/147
USPC .......................... 126/39 R; 138/106; 431/354
See application file for complete search history.

(56) References Cited

U.S. PATENT DOCUMENTS

| 1,874,596 A | 8/1932 | Olson |
| 2,685,461 A | 8/1954 | Mueller |
| 3,787,945 A | 1/1974 | Pasek et al. |
| 3,930,298 A | 1/1976 | Ridenour |
| 3,977,710 A | 8/1976 | Ridenour |
| 4,088,347 A | 5/1978 | Bruggemann et al. |
| 4,126,929 A | 11/1978 | Ridenour |
| 4,200,314 A | 4/1980 | Ridenour |

(Continued)

FOREIGN PATENT DOCUMENTS

| DE | 10326861 A1 | 7/2004 | |
| FR | EP 0225825 A1 * | 6/1987 | ............. F23D 14/64 |

(Continued)

*Primary Examiner* — William G Corboy (57) ABSTRACT

A gas supply module that includes an orifice element; a gas supply tube having an inlet end, an outlet end threaded to receive the orifice element, and an outer diameter; and a beaded element having an outermost dimension at least one and a half times larger than the outer diameter of the gas supply tube, wherein the beaded element is formed directly from the outlet end of the gas supply tube. The gas supply module further includes a support bracket comprising at least one mounting flange, an inlet surface, an outlet surface, and a support hole, wherein the gas supply tube is routed through the support hole; and a fastening element is configured to secure the beaded element to the support bracket. The beaded element may be formed directly from the gas supply tube and may further comprise various shapes, including circular and non-circular shapes.

13 Claims, 8 Drawing Sheets

(56) References Cited

U.S. PATENT DOCUMENTS

| | | |
|---|---|---|
| 4,330,144 A | 5/1982 | Ridenour |
| 4,450,618 A | 5/1984 | Ridenour |
| 4,805,944 A | 2/1989 | Reginaldo |
| 4,871,199 A | 10/1989 | Ridenour |
| 5,024,419 A | 6/1991 | Mulvey |
| 5,362,111 A | 11/1994 | Harbin |
| 5,573,285 A | 11/1996 | Ridenour |
| 5,727,303 A | 3/1998 | Ridenour |
| 5,735,685 A | 4/1998 | Amaya-Orozco et al. |
| 5,829,794 A | 11/1998 | Schulz-Hausmann et al. |
| 5,851,110 A | 12/1998 | Ridenour |
| 6,030,003 A | 2/2000 | Peed et al. |
| 6,170,888 B1 | 1/2001 | Ridenour |
| 6,219,917 B1 | 4/2001 | Peed et al. |
| 6,575,502 B1 | 6/2003 | Ridenour |
| 6,615,822 B2 * | 9/2003 | Moreau ............... F23D 14/04 126/39 R |
| 6,877,779 B2 | 4/2005 | Kerr et al. |
| 2008/0090192 A1 | 4/2008 | Dane et al. |
| 2009/0051165 A1 | 2/2009 | Frost et al. |

FOREIGN PATENT DOCUMENTS

| | | |
|---|---|---|
| JP | 6249378 A | 6/1994 |
| JP | 201065732 A | 3/2010 |

* cited by examiner

GAS SUPPLY MODULE FOR BURNER WITH BEADED GAS SUPPLY TUBE

TECHNICAL FIELD

The disclosure relates to gas-supplied appliances and, more particularly, to gas supply burner modules and assemblies.

BACKGROUND

Many appliances, including cooking ranges and laundry dryers, are powered by natural gas or manufactured gases. During manufacturing and assembly, these appliances must be configured to accept a domestic gas supply. The industry itself is fairly mature, product volumes are high and profit margins are relatively low. Consequently, modest reductions in component material costs and labor can translate into large profit increases for manufacturers.

Gas supply configurations for these appliances must be fabricated with high reliability given the inherent safety aspects of gas-supplied appliances. Further, dimensional control is important in these configurations, particularly between the gas burner and the tubing that supplies the burner with gas. In addition, the configurations employed in these appliances ideally should have low material cost, minimal components, and be amenable to repeatable, simple manufacturing assembly methods. Given the importance of dimensional control between the gas supply tubing and the gas burner, many conventional gas burner modules suffer from relatively low manufacturing yields.

Consequently, there is a need for gas supply module designs (and associated assembly methods) that can be manufactured with low labor and material costs, possess less parts, maintain high reliability, and/or possess good dimensional control.

BRIEF SUMMARY

A first aspect of the disclosure is to provide a gas supply module that includes an orifice element; a gas supply tube having an inlet end adapted to receive a gas supply, an outlet end threaded to receive the orifice element, and an outer diameter; and a beaded element having an outermost dimension at least one and a half times larger than the outer diameter of the gas supply tube, wherein the beaded element is formed directly from the outlet end of the gas supply tube. The gas supply module further includes a support bracket comprising at least one mounting flange, an inlet surface, an outlet surface, and a support hole, wherein the gas supply tube is routed through the support hole; and a fastening element configured to secure the beaded element to the support bracket.

A second aspect of the disclosure is to provide a gas supply module that includes an orifice element; a gas supply tube having an inlet end adapted to receive a gas supply, an outlet end threaded to receive the orifice element, and an outer diameter; and a beaded element having a substantially non-circular shape with an outermost dimension at least one and a half times larger than the outer diameter of the gas supply tube, wherein the beaded element is formed directly from the outlet end of the gas supply tube. The gas supply module further includes a support bracket comprising at least one mounting flange, an inlet surface, an outlet surface, and a support hole, wherein the gas supply tube is routed through the support hole; and a fastening element configured to secure the beaded element to the support bracket.

An additional aspect of the disclosure is to provide a method of assembling the gas module according to the first aspect of the present invention. The method includes the steps: forming the beaded element directly from the outlet end of the gas supply tube, wherein the forming step comprises a mechanical force applied against the gas supply tube; and routing the gas supply tube through the support hole of the support bracket such that the beaded element is located in contact with the support hole. The method also includes the steps: aligning the gas supply tube relative to the support bracket; and securing the beaded element of the gas supply tube to the support bracket.

A still further aspect of the disclosure is to provide a method of assembling the gas module according to the second aspect of the present invention. The method includes the steps: forming the beaded element having a substantially non-circular shape directly from the outlet end of the gas supply tube, wherein the forming step comprises a mechanical pressing action against the gas supply tube; and routing the gas supply tube through the support hole of the support bracket such that the beaded element is received by the support hole. The method also includes the steps aligning the gas supply tube relative to the support bracket; and securing the beaded element of the gas supply tube to the support bracket.

These and other features, advantages, and objects of the disclosure will be further understood and appreciated by those skilled in the art by reference to the following specification, claims, and appended drawings.

DETAILED DESCRIPTION

For purposes of description herein, the aspects of this disclosure may assume various alternative orientations, except where expressly specified to the contrary. The specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
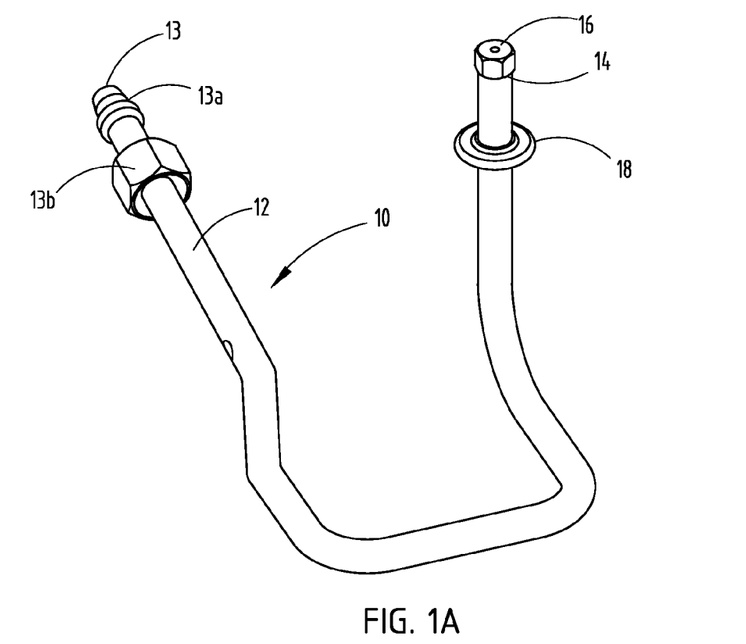
FIG. 1A is a perspective view of a gas supply tube assembly with a circularly shaped beaded element according to one embodiment.
Figure 1B:
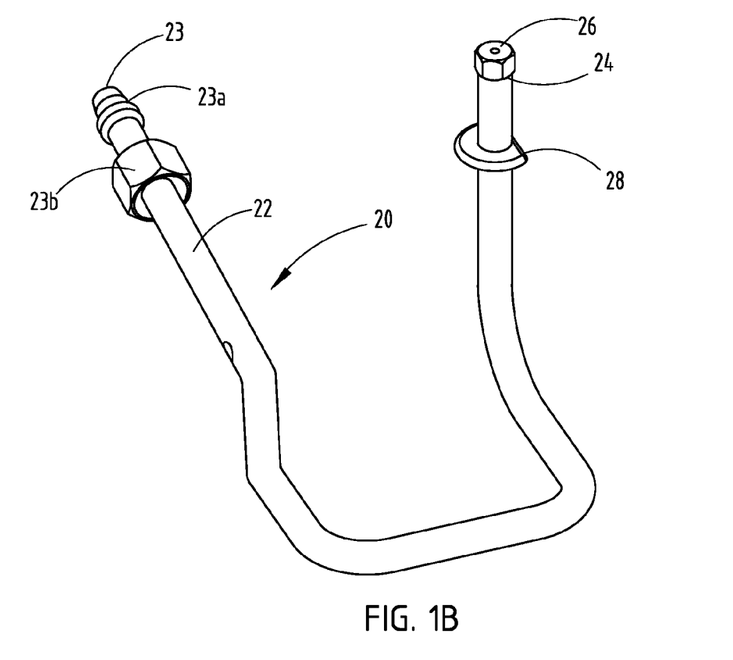
FIG. 1B is a perspective view of a gas supply tube assembly with a non-circularly shaped beaded element according to another embodiment.

Referring to FIGS. 1A and 1B, two gas supply tubing assemblies 10 and 20 are depicted with beaded elements 18 and 28 formed from gas tubing 12 and 22, respectively. Gas tubing 12 and 22 can be fabricated from alloys and other materials suitable for carrying natural gas and other types of gas fuel for use in gas-supplied appliances, such as gas-powered cooktop ranges. For example, various aluminum alloys are suitable for use as tubing 12 and 22.

The gas tubing 12 and 22 elements of assemblies 10 and 20, respectively, include inlet ends 13, 23 and outlet ends 14, 24. The inlet ends 13, 23 may include a ferrule 13a, 23a and a ferrule nut 13b, 23b. These features can be used to connect the gas supply tubing assemblies 10 and 20 to the main supply line (an external gas supply) in the appliance (not shown in FIGS. 1A and 1B). Further, orifice elements 16 and 26 may be threaded into the tubing 12, 22 at the outlet ends 14, 24. The orifice elements are 16 and 26 may reside within gas burners (not shown), and direct the supply of gas within the burner. Also not shown in FIGS. 1A and 1B are elements, valves and the like that can be used to control the flow rates of gas within the tubing 12 and 22 (e.g., based on the operation of a burner input knob by an operator).

In the gas supply tubing assembly 10 shown in FIG. 1A, beaded element 18 can have a substantially circular shape with an outer diameter larger than the diameter of gas tubing 12. A diameter of approximately 8 mm to 30 mm may be used for the beaded element 18. The diameter of the tubing 12, 22 may be set at approximately 2.5 mm to 14 mm. Accordingly, the diameter of beaded element 18 can be set at approximately one and a half times, or more than one and a half times, greater than the diameter of tubing 12, 22. This ensures that the beaded element 18 can properly function to position and align the gas supply tubing assemblies 10, 20 relative to the gas burners (not shown). For example, this relationship helps limit rotational motion of the outlet ends 14, 24 relative to the gas burners (e.g., tipping motions). In one example, the diameter of the beaded element 18 may be set at approximately 14 to 16 mm and the diameter of the gas tubing 12, 22 may be set at approximately 5 to 7 mm.

As shown, beaded element 18 is located on gas tubing 12 in proximity to the outlet end 14, about 15 to 20 mm from orifice element 16. Other ranges for this dimension are flexible based on the design of the gas burner (not shown). The circular aspect of beaded element 18 can be oriented substantially normal to the primary axis of tubing 14. Beaded element 18 can be located at various points along tubing 12 in proximity to orifice element 16 to accommodate the design of the gas burner (not shown) for receiving the orifice element 16. The thickness of beaded element 18 may be set at approximately 1.5 mm to 2.5 mm as shown in FIG. 1A; however, the thickness of beaded element 18 could range from approximately 1 mm to 5 mm, depending on the design of the support bracket 32, 52 and 72 (see FIGS. 2A-4C), required stability of the tubing 14 once mounted to the support bracket 32, manufacturing methods employed to create this feature, and the material thickness of the tubing 12, 22 (typically ranging from 0.7 mm to 2.5 mm).

The gas supply tubing assembly 20 depicted in FIG. 1B is similar to the tubing assembly 10 shown in FIG. 1A. The primary difference between the two assemblies is the configuration for the beaded element. In gas supply tubing assembly 20, the beaded element 28 can have a non-circular shape. Beaded element 28, as shown, is depicted with a circularly-shaped feature and a substantially, straight-edge feature. When beaded element 18 is configured in a non-circular shape, its outermost diameter or dimension can be set at approximately one and a half times, or more than one and a half times, the diameter of the tubing 12, 22.

In FIGS. 1A and 1B, beaded elements 18 and 28 are formed directly from gas supply tubing 12 and 22. Accordingly, beaded elements 18 and 28 may be mechanically formed from the gas supply tubing 12 and 22 elements using an end-forming process. That is, beaded elements 18 and 28 may be forged, pressed, stamped, crimped or otherwise mechanically formed from the outlet end 14, 24 of tubing 12 and 22, respectively. Beaded elements 18 and 28 optionally can be formed from tubing 12 and 22 during heat treatment, tempering or other steps involving heat inputs to the tubing.

As beaded elements 18 and 28 are formed directly from tubing 12 and 22, overall material costs associated with assemblies 10 and 20 are reduced because separate piece parts for the beaded element (or a comparable component) are not required. Another advantage of forming beaded elements 18 and 28 directly from tubing 12 and 22 is the elimination of a manufacturing step or steps associated with joining and sealing such separate piece parts to the gas supply tubing. In addition, as discussed earlier, the relationship between the diameter of the beaded element 18 to the diameter of the tubing 12, 22 provides additional dimensional stability for the assemblies 10, 20 relative to the gas burner. Furthermore, the thickness of the beaded element 18 can be optimized in view of the necessary gas supply module dimensional stability and to avoid yield loss from the formation/process that is dependent on the thickness of the tubing 12, 22.

Figure 2A:
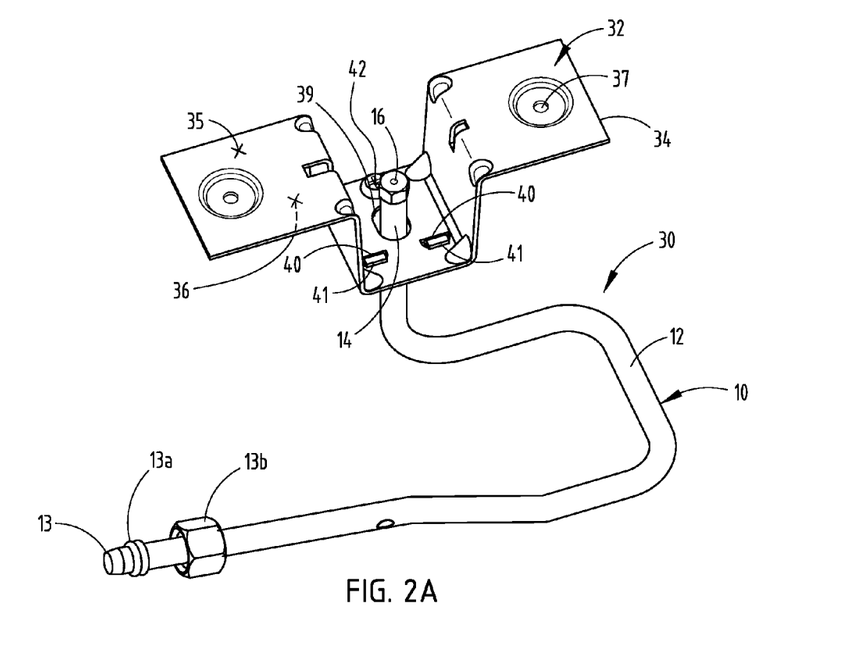
FIG. 2A is a perspective view of a gas supply module with the gas supply tube assembly depicted in FIG. 1A, a support bracket with a pair of alignment tabs and a fastening bracket with a single screw, according to a further embodiment.
Figure 2B:
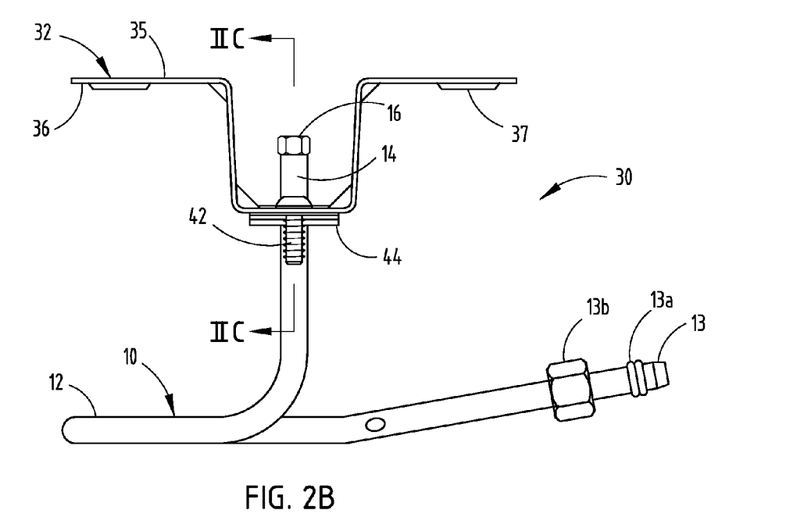
FIG. 2B is side view of the gas supply module depicted in FIG. 2A.

FIGS. 2A-2B depict a gas supply module 30 that incorporates gas tubing assembly 10 and beaded element 18. Gas supply module 30 can be configured to supply gas to a burner of a gas-supplied appliance, such as a gas-powered cooking range (not shown). As discussed earlier, inlet end 13 can be coupled to the gas supply. Further, gas supply module 30 includes a support bracket 32 adapted for mounting the module to the gas-supplied appliance.

The support bracket 32 may include two flanges 34, along with inlet-side surfaces 36 and outlet-side surfaces 35. Through-holes 37 can be located in the flanges 34, configured for connection to the appliance via screws, bolts or other types of fasteners (not shown). The support bracket 32 also may include a support hole 39, sized to allow routing of the outlet end 14 of the gas supply tube assembly 10. Typically, support bracket 32 can be configured in a U-shape to ensure that the outlet end 14 of the assembly 10 is located some distance below the appliance surface coupled to the flanges 34 of the bracket 32. Support bracket 32 may function to ensure dimensional control and alignment of the orifice 16 relative to the appliance surface coupled to the flanges 34.

Figure 2C:
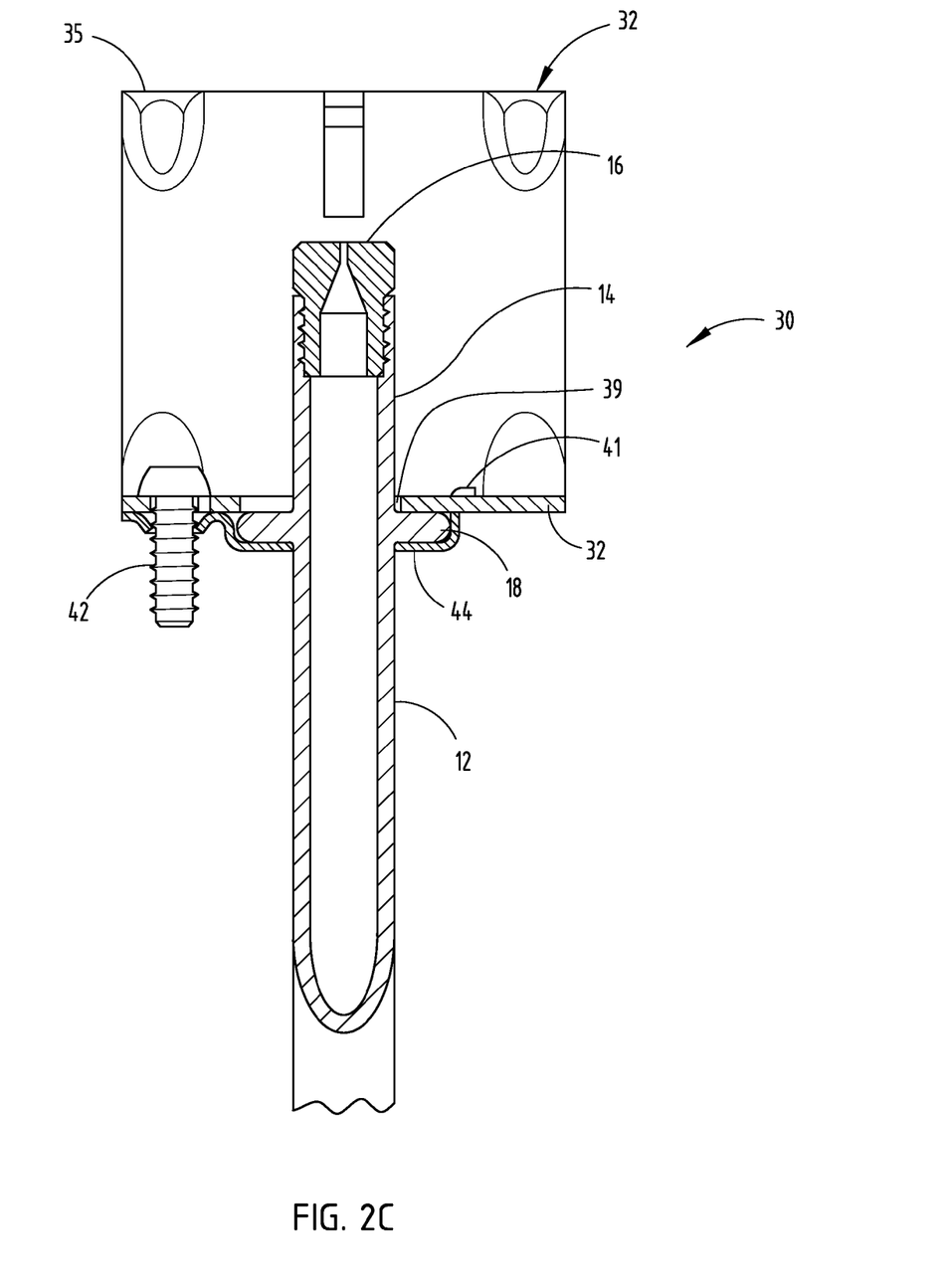
FIG. 2C is a cross-sectional, side view of the gas supply module depicted in FIG. 2A through Line II.C-II.C.

FIG. 2C provides a cross-sectional view of the module 30 through Line II.C-II.C and, in particular, demonstrates the interaction of the beaded element 18 (as formed from gas supply tube 12) and the support bracket 32. As the outlet end 14 of the gas supply tube 12 is routed through the support bracket hole 39, beaded element 18 may be placed in close contact to the inlet-side surface 36 of the bracket 32 (see FIGS. 2A-2B). Because beaded element 18 typically possesses a larger diameter than the support bracket hole 39, tubing 12 should be restrained in the vertical direction.

As also shown in FIGS. 2B and 2C, gas supply module 30 may additionally include a fastener 44 configured to secure the beaded element 18 and the gas supply tubing 12 to the support bracket 32. The fastener bracket 44 may include alignment tabs 41 and bracket screw 42, configured for coupling the fastener bracket 44 to the support bracket 32. The alignment tabs 41 can be inserted into alignment tab holes 40 (see FIG. 2A) on the support bracket 32. Bracket screw 42 may also be configured to connect support bracket 32 to the fastener bracket 44. In addition, fastener bracket 44 can include an appropriate bend, recess or other comparable shape to secure the beaded element 18 to support bracket 32. Bracket 44 can also be shaped and configured to match the shape and configuration of beaded element 18. Hence, fastener bracket 44 may have a recess or other similar feature to accommodate the generally circular shape of beaded element 18.

Fastener bracket 44, depicted in FIGS. 2B-2C, may function to secure and lock beaded element 18 (of the gas supply tubing assembly 10) to the support bracket 32. In turn, fastener bracket 44 can ensure tight dimensional control and stability for the location of the orifice element 16 relative to the gas-supplied appliance (not shown). Once the fastener bracket 44 is locked into place, beaded element 18 and gas supply tubing assembly 10 cannot readily move in the X, Y and Z directions. Further, with a tight connection between fastener bracket 44 and support bracket 32, gas supply tubing assembly 10 cannot rotate relative to the support bracket 32.

Figure 3A:
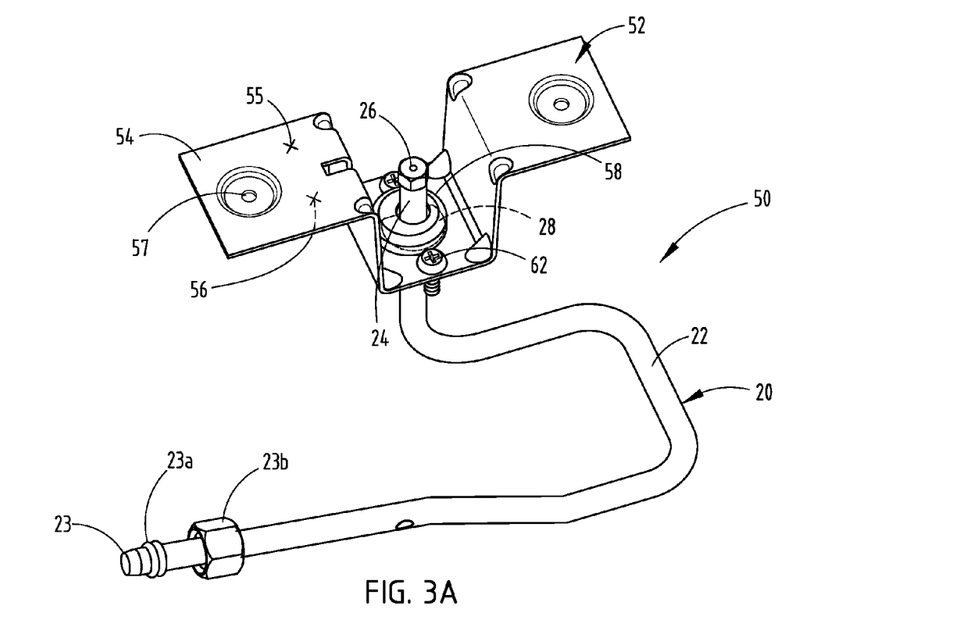
FIG. 3A is a perspective view of a gas supply module with the gas supply tube assembly depicted in FIG. 1B, a support bracket with a recessed feature having a non-circular shape for receiving the non-circularly shaped beaded element, and a fastening bracket with a pair of screws, according to an additional embodiment.
Figure 3B:
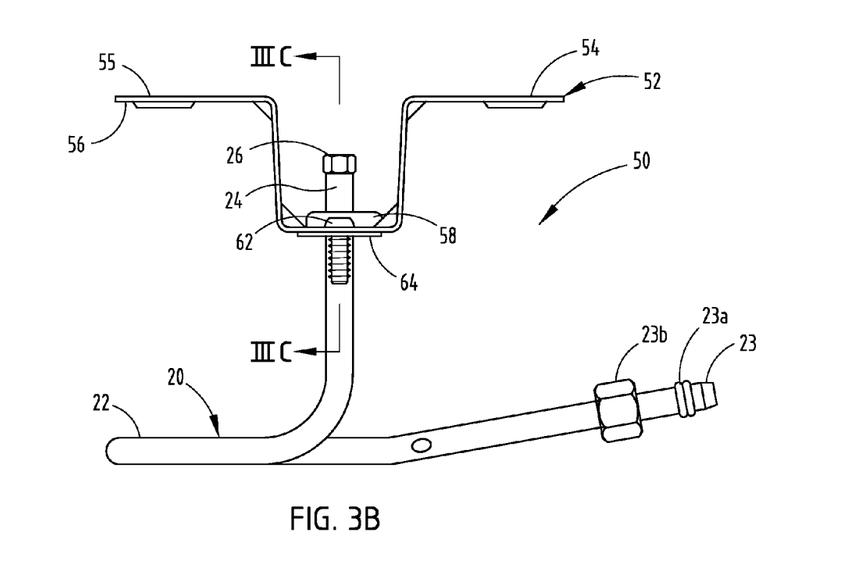
FIG. 3B is side view of the gas supply module depicted in FIG. 3A.
Figure 3C:
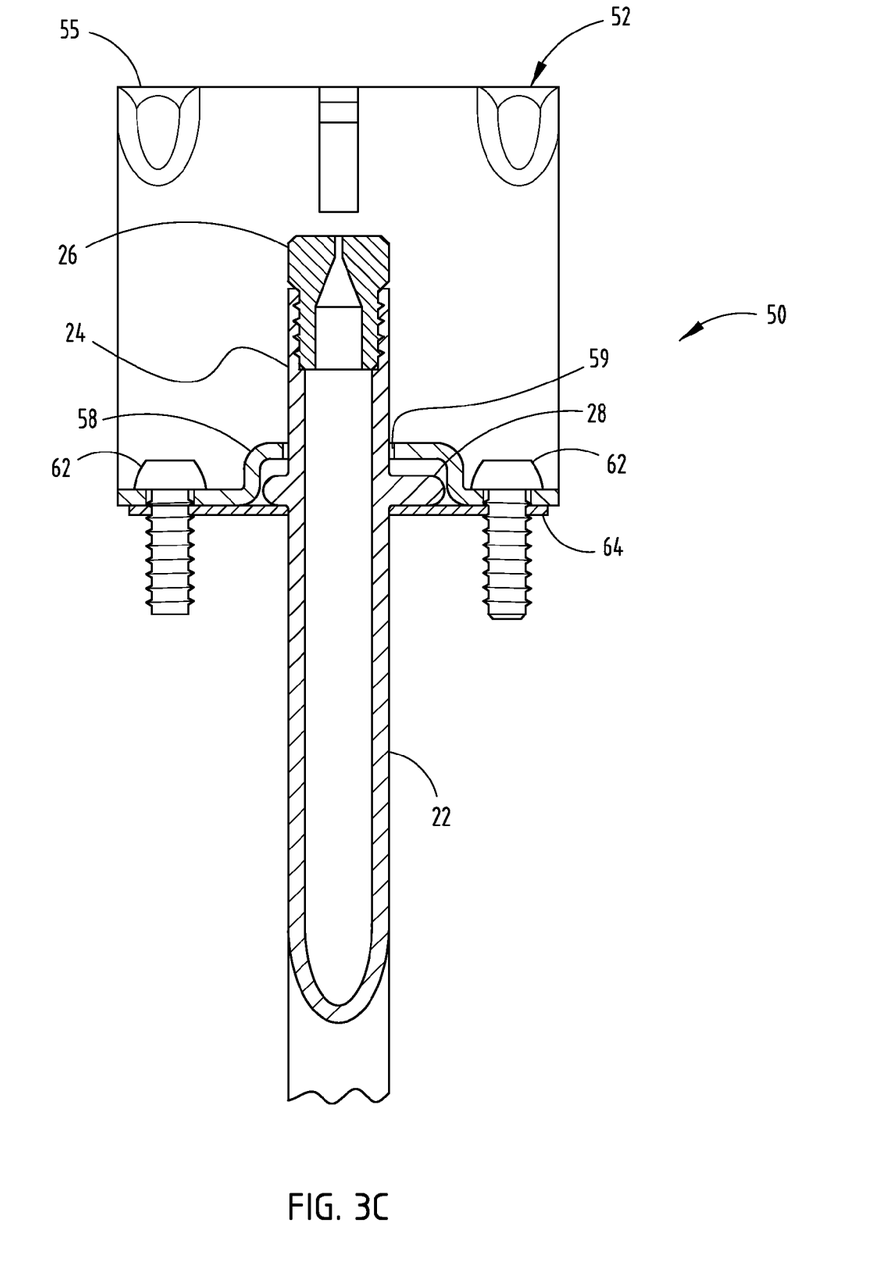
FIG. 3C is a cross-sectional, side view of the gas supply module depicted in FIG. 3A through Line III.C-III.C.

Another embodiment is depicted in FIGS. 3A-3C, namely, gas supply module 50. Here, gas supply module 50 may be configured with the gas tubing supply assembly 20 with a non-circularly shaped beaded element 28 (see FIG. 1B). As shown, gas supply module 50 may be configured to supply gas to a burner of a gas-supplied appliance, such as a gas-powered cooking range (not shown). Inlet end 23 of gas tubing 22 can be coupled to the gas supply (not shown). Further, gas supply module 50 may include a support bracket 52 adapted for mounting the module to the gas-supplied appliance.

The support bracket 52 may include two flanges 54, along with inlet-side surfaces 56 and outlet-side surfaces 55. Through-holes 57 can be located in the flanges 54, configured for connection to the appliance via screws, bolts or other types of fasteners (not shown). Like support bracket 32 (shown in FIGS. 2A-2C), support bracket 52 in FIGS. 3A-3C can also include a support hole 59, sized to allow routing of the outlet end 24 of the gas supply tube assembly 20. Support bracket 52 may also be configured in a U-shape to ensure that the outlet end 24 of the assembly 20 is located some distance below the appliance surface coupled to the flanges 54 of the bracket 52. Support bracket 52 may also function to ensure dimensional control and alignment of the orifice 26 relative to the appliance surface coupled to the flanges 54.

FIG. 3C provides a cross-sectional view of the gas supply module 50 through Line III.C-III.C and, in particular, demonstrates the interaction of the beaded element 28 (as formed from gas supply tube 22) and the support bracket 52. As the outlet end 24 of the gas supply tube 22 is routed through the support bracket hole 59, beaded element 28 may be placed in close contact to the inlet-side surface 56 of the bracket 52 (see FIGS. 3A-3B). Because beaded element 28 typically possesses a larger diameter than the support bracket hole 59, tubing 22 can be restrained in the vertical direction.

Support bracket 52 may also include a recess 58, configured to accommodate the non-circular shape of beaded element 28. The recess 58 may be slightly larger in depth than the thickness of beaded element 28. Further, the shape of 58 can tightly match the shape of beaded element 28. Consequently, recess 58 prevents rotation of beaded element 28 and gas tubing 22 (coupled to beaded element 28) once gas tubing 22 is routed through the bracket support hole 59 and the beaded element 28 is positioned within recess 58.

As also shown in FIGS. 3B and 3C, gas supply module 50 may additionally include a fastener 64 configured to secure the beaded element 28 and the gas supply tubing 22 to the support bracket 52. The fastener bracket 64 may include two bracket screws 62, configured for coupling the bracket 64 to the support bracket 52. Fastener bracket 64, depicted in FIGS. 3B-3C, may function to secure and lock beaded element 28 (of the gas supply tubing assembly 20) to the support bracket 52. In turn, fastener bracket 64 can ensure tight dimensional control and stability for the location of the orifice 26 relative to the gas-supplied appliance (not shown). Once the fastener bracket 64 is locked into place, beaded element 28 and gas supply tubing assembly 20 cannot readily move in the X, Y and Z directions.

Figure 4A:
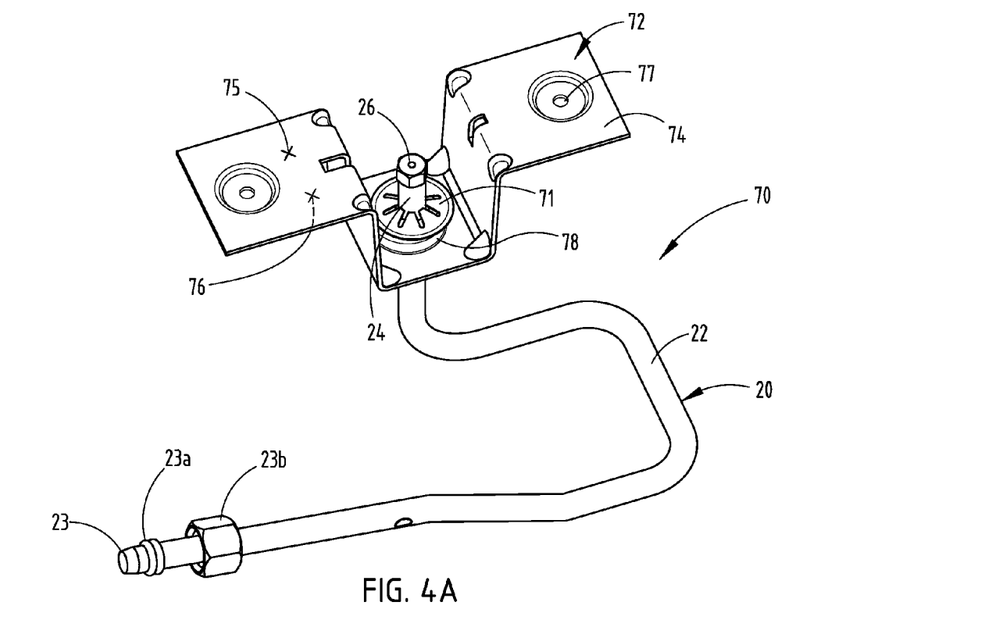
FIG. 4A is a perspective view of a gas supply module with the gas supply tube assembly depicted in FIG. 1B, a support bracket with a recessed feature having a non-circular shape for receiving the non-circularly shaped beaded element, and a lock washer fastening element, according to another embodiment.
Figure 4B:
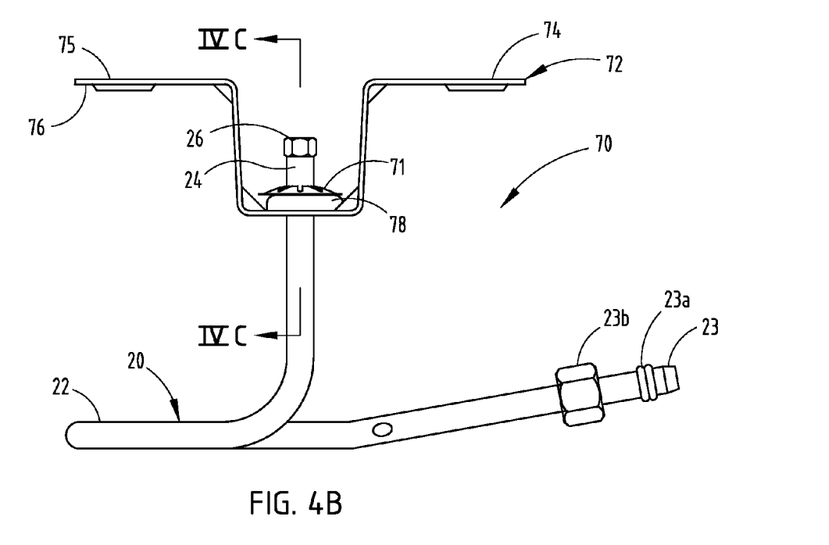
FIG. 4B is side view of the gas supply module depicted in FIG. 4A.
Figure 4C:
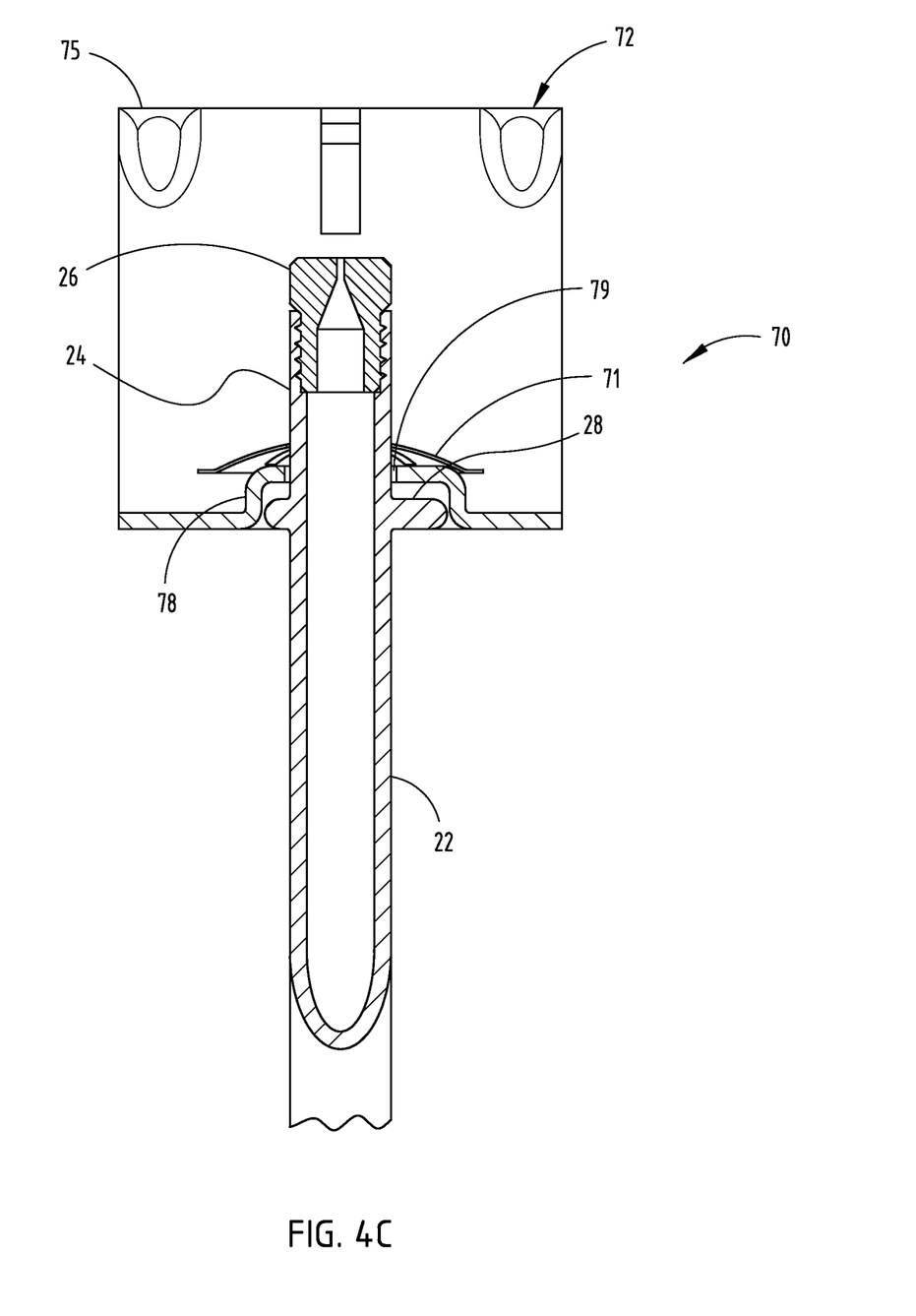
FIG. 4C is a cross-sectional, side view of the gas supply module depicted in FIG. 4A through Line IV.C-IV.C.

An additional embodiment is depicted in FIGS. 4A-4C, namely, gas supply module 70. Module 70 is very similar to the gas supply module 50 depicted in FIGS. 3A-3C, including its use of gas supply tube assembly 20. For example, support bracket 72 may include two flanges 74, along with an inlet-side surfaces 76 and outlet-side surfaces 75. Comparable to the support brackets 32 and 52 (as shown in FIGS. 2A-2C; and FIGS. 3A-3C), support bracket 72 may also include a support hole 79, sized to allow routing of the outlet end 24 of the gas supply tube assembly 20. Support bracket 72 may also be configured in a U-shape to ensure that the outlet end 24 of the assembly 20 is located some distance below the appliance surface coupled to the flanges 74 of the bracket 72. Support bracket 72 can also function to ensure dimensional control and alignment of the orifice element 26 relative to the appliance surface coupled to the flanges 74.

FIG. 4C provides a cross-sectional view of the module 70 through Line IV.C-IV.C and, in particular, demonstrates the interaction of the beaded element 28 (as formed from gas supply tube 22) and the support bracket 72. As the outlet end 24 of the gas supply tube 22 is routed through the support bracket hole 79, beaded element 28 may be placed in close contact to the inlet-side surface 76 of the bracket 72 (see FIGS. 4A-4B). Because beaded element 28 typically possesses a larger diameter than the support bracket hole 79, tubing 22 is restrained in the vertical direction.

Support bracket 72 also may include a recess 78, configured to accommodate the non-circular shape of beaded element 28. The recess 78 may be slightly larger in depth than the thickness of beaded element 28. Further, the shape of 78 generally matches the shape of beaded element 28. Consequently, recess 78 can prevent rotation of beaded element 28 and the gas tubing 22 from which it is formed, once gas tubing 22 is routed through the bracket support hole 79 and the beaded element 28 is positioned within recess 78.

One significant difference between gas supply module 50 (see, e.g., FIGS. 3A-3C) and gas supply module 70 (see, e.g., FIGS. 4A-4C) is the feature that can be used to secure the beaded element 28 and gas supply tube 22 to the support bracket 52, 72. Unlike gas supply module 50, module 70 does not rely on a fastener bracket and fasteners, screws or the like to secure the beaded element 28 to the inlet surface 76 of the support bracket 72. Instead, module 70 can rely on a lock washer 71 for this function. In particular, lock washer 71 can be fitted over the outlet end 24 of the gas tubing 22 and tightened in close proximity to the outlet surface 75 of the support bracket 72 (see FIG. 4C). As a result, beaded element 28 can prevent upward vertical motion and lock washer 71 prevents downward motion of gas tubing 22 within bracket support hole 79.

Figure 5A:
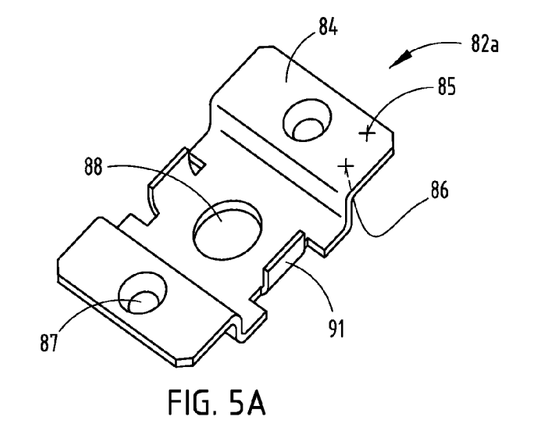
FIG. 5A is a perspective view of a fastener bracket with two fastening screws, two alignment tabs and a recessed feature to accommodate a gas supply tube with a beaded element.
Figure 5B:
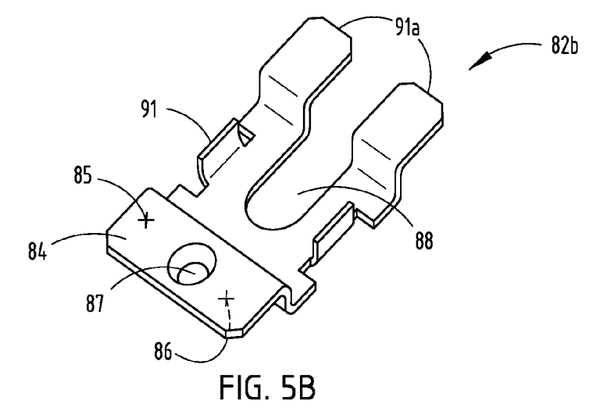
FIG. 5B is a perspective view of a fastener bracket with one fastening screw, two alignment tabs and a recessed feature to accommodate a gas supply tube with a beaded element.
Figure 5C:
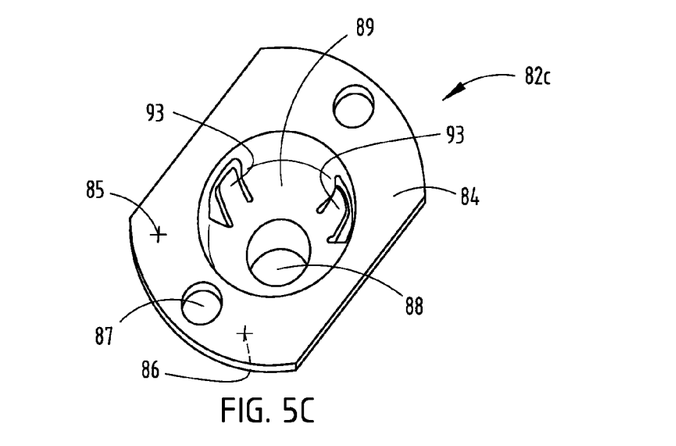
FIG. 5C is a perspective view of a fastener bracket with two fastening screws, three fixation tabs and a recessed feature to accommodate a gas supply tube with a circularly-shaped, beaded element.

FIGS. 5A-5C depict additional fastener bracket embodiments 82a, 82b and 82c, respectively. Each of these fastener brackets can be used to secure a gas supply tube with a beaded element 18, 28 to a support bracket comparable to the support brackets 32, 52 and 72 shown in FIGS. 2A-4C. Fastener brackets 82a, 82b and 82c can each prevent movement of the beaded element 18, 28 and the gas supply tubing 12, 22 shown in FIGS. 1A and 1B in the vertical direction relative to the support bracket. They also may restrain motion of these elements in the X and Y directions.

In particular, fastener brackets 82a-82c can possess a configuration similar to fastener brackets 44 and 64 depicted in FIGS. 2A-2C; and 3A-3C. These brackets 44 and 64 may include flanges 84, mounting holes 87, and tubing support hole/slot 88. The mounting hole(s) 87 can be used to fasten the fastening bracket 82a-82c to the support bracket, thereby securing the beaded element 18, 28 of the gas tubing 12, 22 within the confines of the fastener and support brackets. Further, each fastener bracket can include inlet surface 86 and outlet surface 85.

As shown in FIG. 5A, fastener bracket 82a can include two mounting holes 87 to secure the bracket and beaded element 18, 28 to the support bracket (not shown). Fasteners, screws or the like (not shown) may be routed through mounting holes 87 for this purpose. Although the pair of mounting holes 87 and fasteners used in bracket 82a usually increases material and labor cost (e.g., relative to the single-fastener design for fastener bracket 44 (see FIGS. 2A-2C)), the additional support provided by the second fastener provides added dimensional stability for the gas tubing within the appliance. In addition, the alignment tabs 91 (also arranged for the purpose of securing the fastener bracket 82a to the support bracket) can be configured to straddle the tubing support hole/slot 88, offset from the mounting holes 87. Consequently, bracket 82a may be particularly advantageous when tight dimensional control and stability of the gas tubing relative to the support bracket is a requirement.

As for the fastener bracket 82b embodiment depicted in FIG. 5B, it appears to offer cost and labor savings relative to fastener bracket 82a. Fastener bracket 82b can rely on only one mounting hole 87, thus requiring one less fastener, screw or the like as compared to fastener bracket 82a. In addition, the tubing support hole/slot 88 can be configured as a slot, thus improving ease-of-assembly for the gas supply module, as compared to the fastener bracket 82a that relies on a hole 88 slightly larger than the diameter of the tubing 12, 22. In addition, alignment tabs 91a (on the opposite side of bracket 82b from mounting hole 87) can be inserted into the support bracket (not shown) to provide additional stability. Thus, alignment tabs 91a can provide further restraint for the beaded element 18, 28.

Fastener bracket 82c, shown in FIG. 5C, can offer good dimensional stability for the beaded elements 18, 28 and gas tubing 12, 22 relative to the support bracket. In particular, bracket 82c can possess a recess 89, shaped to accommodate the shape of beaded element 18, 28 (or other beaded element shapes and configurations). In addition, fastener bracket 82c can include fixation tabs 93, configured to further restrain beaded element 18, 28. Fixation tabs 93 can flex to accommodate beaded elements 18, 28 of various diameters (or beaded element 18, 28 with less manufacturing-related dimensional control).

It should be apparent to one of ordinary skill in the art that the features of the gas supply modules and methods described above, and depicted in FIGS. 1A-5C, may be employed in various gas-powered appliances. Furthermore, the particular embodiments described are exemplary of the possible tubing, beaded element, bracket and other component configurations that can be employed as taught by this disclosure. Indeed, these configurations may be equally applicable for use in other appliances and systems with a gas supply or the like.

Other variations and modifications can be made to the aforementioned structures and methods without departing from the concepts of this disclosure. These concepts, and those mentioned earlier, are intended to be covered by the following claims unless the claims by their language expressly state otherwise.

We claim:

1. A gas supply module, comprising:
    an orifice element;
    a gas supply tube having an inlet end adapted to receive a gas supply, an outlet end threaded to receive the orifice element, and an outer diameter,
    a substantially circular beaded element having an outermost dimension at least one and a half times larger than the outer diameter of the gas supply tube, wherein the beaded element is formed directly from the outlet end of the gas supply tube;
    a support bracket comprising at least one mounting flange, an inlet surface, an outlet surface, and a support hole, wherein the gas supply tube is routed through the support hole; and
    a fastening element configured to secure the beaded element and the gas supply tube to the support bracket, wherein the fastening element comprises a fixation bracket coupled to the inlet surface of the support bracket and the beaded element; and
    wherein the fixation bracket comprises:
    a circularly-shaped, recessed feature configured to receive the beaded element and having a plurality of alignment tabs adapted to align the gas supply tube relative to the support bracket and a pair of opposing fixation flanges adapted to affix the fixation bracket to the support bracket.

2. The gas supply module according to claim 1, wherein the orifice element, the gas supply tube, and the support bracket are adapted for use with a cooktop burner assembly.

3. The gas supply module according to claim 1, wherein the beaded element is mechanically formed from the gas supply tube.

4. The gas supply module according to claim 1, wherein the beaded element is mechanically formed from the gas supply tube.

5. The gas supply module according to claim 1, wherein the fastening element comprises a lock washer coupled to the gas supply tube at a location in proximity to the outlet surface of the support bracket.

6. The gas supply module according to claim 1, wherein the fixation bracket further comprises a pair of opposing alignment tabs adapted to align the gas supply tube relative to the support bracket.

7. The gas supply module according to claim 1, wherein the fixation bracket further comprises a fixation flange adapted to affix the fixation bracket to the support bracket.

8. The gas supply module according to claim 1, wherein the fixation bracket further comprises a pair of opposing alignment tabs adapted to align the gas supply tube relative to the support bracket.

9. A gas supply module, comprising:
an orifice element;
a gas supply tube having an inlet end adapted to receive a gas supply, an outlet end threaded to receive the orifice element, and an outer diameter;
a beaded element having a substantially non-circular shape with an outermost dimension at least one and a half times larger than the outer diameter of the gas supply tube, wherein the beaded element is formed directly from the outlet end of the gas supply tube;
a support bracket comprising at least one mounting flange, an inlet surface, an outlet surface, and a support hole, wherein the gas supply tube is routed through the support hole; and
a fastening element configured to secure the beaded element and the gas supply tube to the support bracket, wherein the fastening element comprises a fixation bracket coupled to the inlet surface of the support bracket and the beaded element; and
wherein the fixation bracket comprises a recessed feature configured to receive the beaded element and having a plurality of alignment tabs adapted to align the gas supply tube relative to the support bracket and a pair of opposing fixation flanges adapted to affix the fixation bracket to the support bracket.

10. The gas supply module according to claim 9, wherein the beaded element comprises a circularly-shaped feature and a substantially, straight-edged feature.

11. The gas supply module according to claim 9, wherein the orifice element, gas supply tube, and support bracket are adapted for use with a cooktop burner assembly.

12. The gas supply module according to claim 9, wherein the beaded element is mechanically formed from the gas supply tube.

13. The gas supply module according to claim 9, wherein the recessed feature has a substantially non-circular shape for receiving the beaded element.

\* \* \* \* \*